(12) United States Patent
Matthews et al.

(10) Patent No.: US 7,380,033 B2
(45) Date of Patent: *May 27, 2008

(54) COMMUNICATION APPARATUS IMPLEMENTING TIME DOMAIN ISOLATION WITH RESTRICTED BUS ACCESS

(75) Inventors: Phillip M. Matthews, Austin, TX (US); Frederick A. Rush, Austin, TX (US); G. Diwakar Vishakhadatta, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/479,733

(22) Filed: Jun. 30, 2006

(65) Prior Publication Data

US 2006/0253634 A1  Nov. 9, 2006

Related U.S. Application Data

(63) Continuation of application No. 10/814,426, filed on Mar. 31, 2004.

(51) Int. Cl.
*G06F 13/00* (2006.01)
*G06F 3/00* (2006.01)
*H04Q 7/20* (2006.01)
*H04B 7/00* (2006.01)
*H04L 25/08* (2006.01)
*H04N 7/14* (2006.01)

(52) U.S. Cl. .................. 710/110; 710/37; 455/455; 455/515; 455/528; 348/14.1; 375/346

(58) Field of Classification Search .............. 710/110, 710/36, 37; 455/455, 515, 528; 348/14.1; 375/346
See application file for complete search history.

(56) References Cited

U.S. PATENT DOCUMENTS 5,842,037 A * 11/1998 Haartsen ..................... 710/1
6,738,845 B1 * 5/2004 Hadwiger et al. .......... 710/240

FOREIGN PATENT DOCUMENTS

WO  WO2004021684  * 3/2004

* cited by examiner

*Primary Examiner*—Mark H. Rinehart
*Assistant Examiner*—Christopher Daley
(74) *Attorney, Agent, or Firm*—Peter Zawilski

(57) ABSTRACT

A communication apparatus includes a radio frequency circuit that operates on a radio frequency signal and a digital processing circuit coupled to the radio frequency circuit. The digital processing circuit includes a plurality of bus masters coupled to a shared bus. A bus arbiter is provided for arbitrating between requests to access the bus by a first bus master and one or more other bus masters. Accesses by the one or more other bus masters to the bus are restricted in response to a signal indicative of a change in a mode of operation of the RF circuit. In one particular implementation, a communication apparatus employs time domain isolation wherein the digital processing circuit may be placed in a shutdown mode when the radio frequency circuit is active.

20 Claims, 6 Drawing Sheets

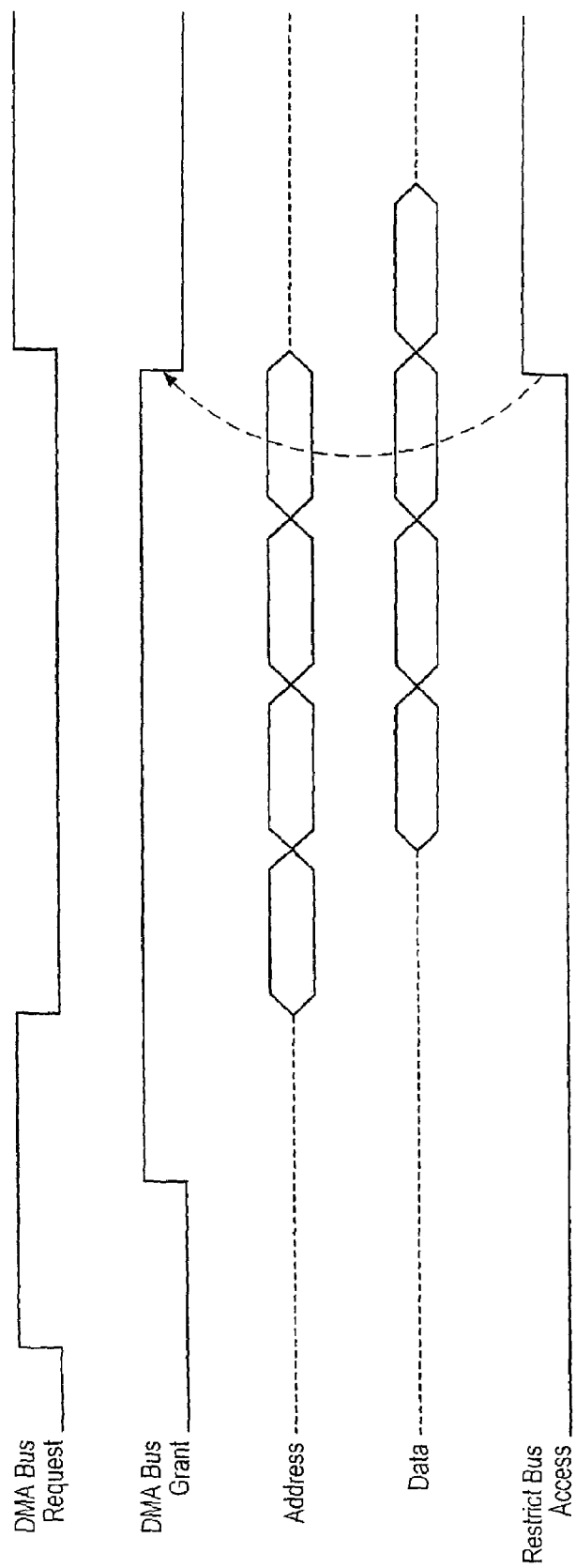

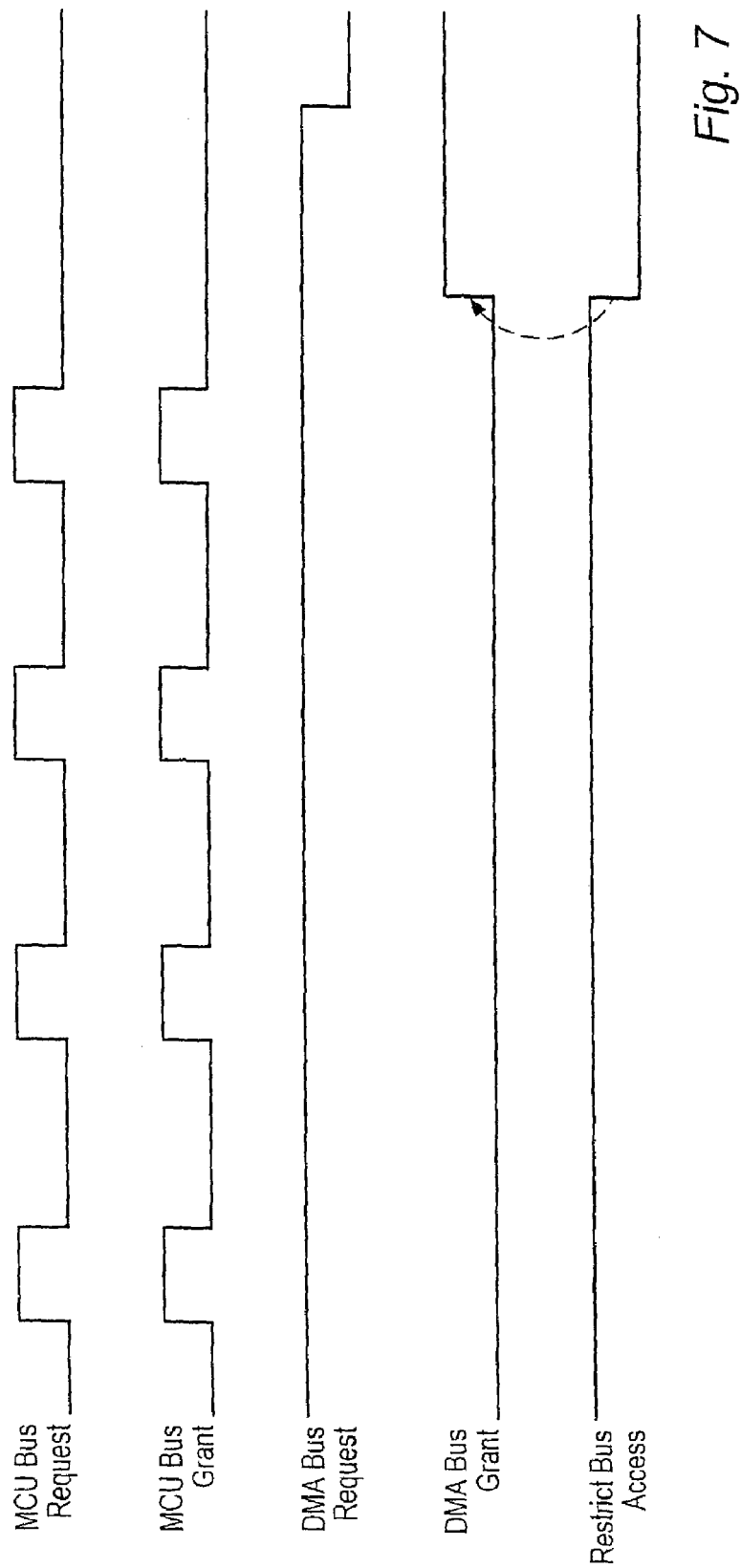

COMMUNICATION APPARATUS IMPLEMENTING TIME DOMAIN ISOLATION WITH RESTRICTED BUS ACCESS

This application is a continuation of U.S. patent application Ser. No. 10/814,426, entitled "COMMUNICATION APPARATUS IMPLEMENTING TIME DOMAIN ISOLATION WITH RESTRICTED BUS ACCESS", filed Mar. 31, 2004.

BACKGROUND OF THE INVENTION

1. Field of the Invention

This patent document relates generally to communication apparatus including radio frequency (RF) circuits and, more particularly, to bus arbitration of bus masters within digital processing circuits of communication apparatus that implement time domain isolation techniques.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often critical to minimize noise and interference from sources external or even internal to the communication apparatus.

In addition to the RF front-end circuitry, typical wireless communication apparatus may also include digital processing circuitry that performs various digital functions including, for example, low level baseband signal processing, implementation of the communication protocol stack, and various user interface functionality. The digital processing circuitry may include a variety of specific hardware such as a DSP (digital signal processor), an MCU (microcontroller unit), hardware accelerators, memory, and/or I/O interfaces, among numerous other specific hardware devices.

Unfortunately, the digital processing circuitry of a typical communication apparatus can be a significant source of detrimental noise and interference. More particularly, the digital processing circuitry in a typical high performance communication apparatus produces digitals signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, cause spurious emissions that may interfere with, and may adversely impact, the performance of the RF front-end circuitry. Thus, in many systems, the RF front-end circuitry is implemented on an integrated circuit die that is separate from the integrated circuit die on which the digital processing circuitry is implemented. Additionally, the RF front-end circuitry and digital processing circuitry are often placed in separate electrical cavities, where the shielding of the cavities helps to isolate the electrical and magnetic coupling.

Implementing the RF front-end circuitry and the digital processing circuitry on separate dies, however, has several disadvantages, such as increased component count, size, and overall cost, and more potential for decreased reliability and increased manufacturing failures. It is thus desirable to allow integration of the RF front-end circuitry and digital processing circuitry on a single integrated circuit die without significant degradation and performance due to interference.

SUMMARY OF THE INVENTION

Various embodiments of a communication apparatus with restricted bus access are disclosed. In one embodiment, a communication apparatus includes a radio frequency circuit that operates on a radio frequency signal and a digital processing circuit coupled to the radio frequency circuit. The digital processing circuit includes a plurality of bus masters coupled to a shared bus. A bus arbiter is provided for arbitrating between requests to access the bus by a first bus master and one or more other bus masters. Accesses by the one or more other bus masters to the bus are restricted in response to a signal indicative of a change in a mode of operation of the RF circuit.

In one particular implementation, a communication apparatus employs time domain isolation wherein the digital processing circuit may be placed in a shutdown mode when the radio frequency circuit is active (receiving or transmitting). Prior to the shutdown mode, time critical functions may need to be performed by the first bus master, such as MCU. Accordingly, to prevent bus contention during performance of the time critical functions, access to the shared bus by the other bus masters may be restricted in response to a bus restrict signal that is asserted a predetermined time prior to radio activity and deasserted a predetermined time after radio activity.

BRIEF DESCRIPTION OF THE DRAWINGS

FIG. 6 is a timing diagram illustrating early termination of a burst cycle in one embodiment of a digital processing circuit.

FIG. 7 is a timing diagram which illustrates the handling of bus requests in one embodiment of a digital processing circuit.

Figure 1:
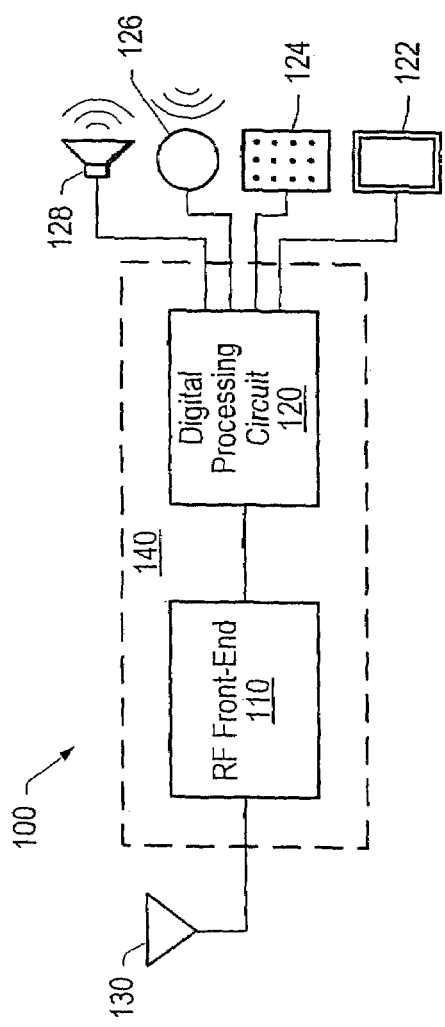
FIG. 1 illustrates a generalized block diagram of a communication apparatus including an RF front-end circuit and a digital processing circuit.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a generalized block diagram of a communication apparatus 100 including an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement the Global System for Mobile Communications (GSM) standard, the Personal Communications Service (PCS) standard, the Digital Cellular System (DCS) standard, the General Packet Radio Service (GPRS) standard, and/or the Enhanced General Packet Radio Service standard (E-GPRS), which may also be referred to as the Enhanced Data for GSM Evolution (EDGE) standard, among others.

RF front-end circuit 110 may accordingly include circuitry to provide the RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack and/or control of user I/O operations and applications. To perform such functionality, digital processing circuit 120 may include various specific circuitry, such as a software programmable MCU and/or DSP, as well as a variety of specific peripheral circuits such as memory controllers, direct memory access (DMA) controllers, hardware accelerators, voice coder-decoders (CODECs), UARTs (universal asynchronous receiver transmitters), and user interface circuitry. The choice of digital processing hardware (and firmware/software, if included) depends on the design and performance specifications for a given desired implementation, and may vary from embodiment to embodiment.

Figure 2:
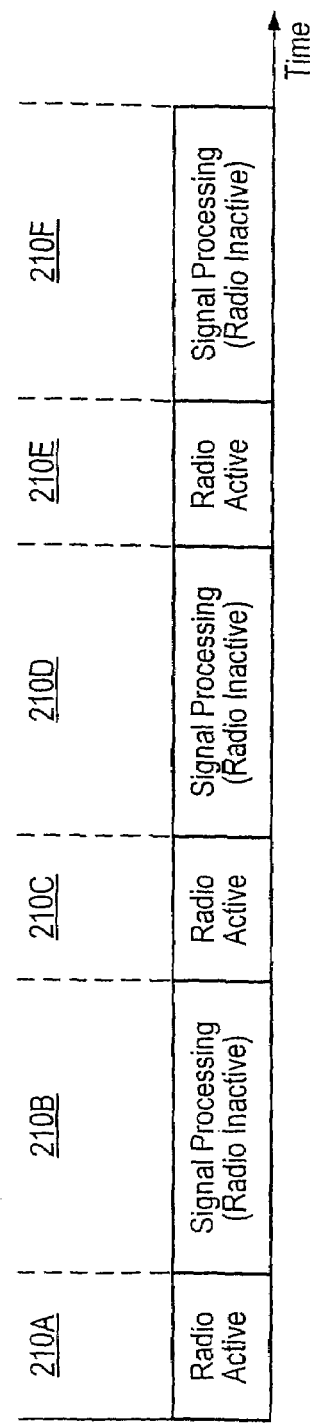
FIG. 2 illustrates a set of events that occur in a communication apparatus according to time domain isolation.

In one embodiment, RF front-end circuit 110 and digital processing circuit 120 may be integrated on the same integrated circuit die 140. To reduce interference and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities so as to avoid or reduce interference between the RF front-end circuit 110 and the digital processing circuit 120.

As shown in FIG. 2, communication apparatus 100 employs a plurality of timeslots 210A-210F, and so on. During RF timeslots 210A, 210C and 210E, RF front-end circuit 110 may receive RF signals, process the received signals, and store the results. Subsequently, during signal processing timeslots 210B, 210D and 210F, respectively, digital processing circuit 120 may perform signal processing tasks on the stored results.

Alternatively, during RF timeslots 210A, 210C and 210E, RF front-end circuit 110 may transmit RF signals. Thus, in this mode of operation, during signal processing timeslots 210B and 210D, digital processing circuit 120 performs signal processing tasks on input data (e.g., voice, data), and stores the results. Subsequently, during RF timeslots 210C and 210E, respectively, RF front-end circuit 110 may perform RF operations on the stored results (for example, up-conversion) and transmit an RF signal.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications, as desired.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 may be placed in a shutdown mode of operation when an RF timeslot commences (i.e., when the radio is active). In one embodiment, during the shutdown mode of operation, a clock signal or signals within digital processing circuit 120 are disabled or inhibited. More specifically, by using static metal oxide semiconductor (MOS) circuitry, for example, the clock signal or signals within the digital processing circuit 120 may be shut down without losing data present within that circuitry. Accordingly, the digital processing circuit 120 can preserve the data within it while the RF front-end circuit 110 is active. Once the RF front-end circuit 110 has completed its reception or transmission (e.g., an RF timeslot has ended), the shutdown mode of digital processing circuit 120 may be discontinued by re-enabling the clock signal or signals. Digital processing operations on the data may then continue or commence. By disabling the clock or clocks in digital processing circuit 120 while front-end circuit 110 is active (i.e., receiving or transmitting), the amount of digital noise and thus spurious signals at the RF band of interest may be reduced, thus accommodating high performance.

It is noted that although FIG. 2 depicts the operation of the RF front-end circuit 110 and the digital processing circuit 120 as alternative events, these operations need not be mutually exclusive. Generally, it may be desirable to reduce or minimize the amount of overlap between the operation of the RF front-end circuit 110 and the digital processing circuit 120. Depending on a number of factors, however, the active operation of RF front-end circuit 110 and signal processing operations of digital processing circuit 120 may overlap to a certain extent.

It is also noted that in some alternative embodiments, the shutdown mode of digital processing circuit 120 may be implemented by causing circuit portions to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that not all of the circuitry comprising digital processing circuit 120 need be disabled or inhibited during the shutdown mode (i.e., the circuitry of digital processing circuitry 120 may be partially powered down, disabled, or inhibited during the shutdown mode). Thus, some circuitry of digital processing circuitry 120 (e.g., dynamic memory) may be clocked even during the shutdown mode.

Figure 3:
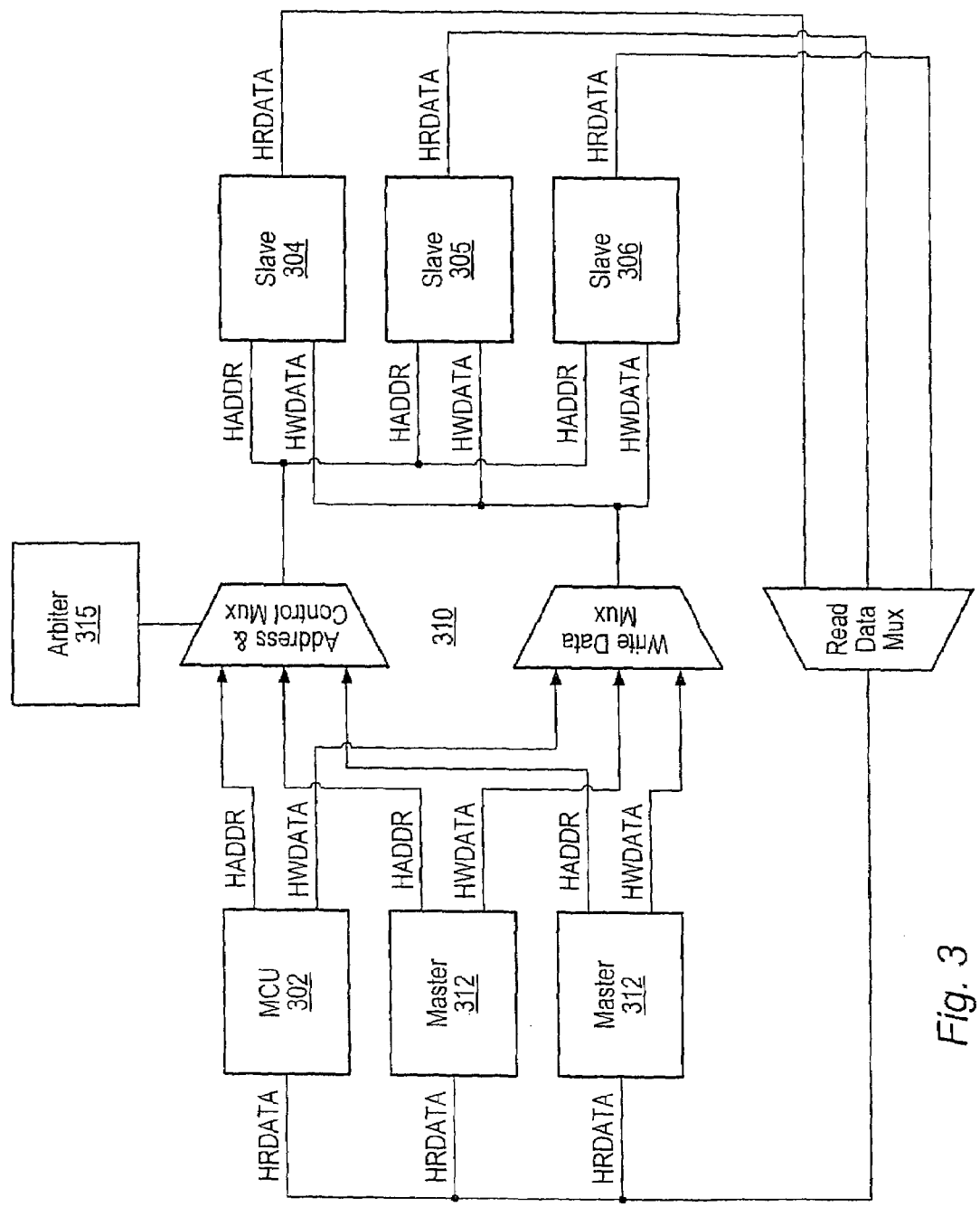
FIG. 3 illustrates a plurality of bus masters coupled to a plurality of slave devices through a shared bus.

As stated previously, digital processing circuit 120 may include a processing unit such as an MCU and/or DSP core and a variety of peripheral devices. In one embodiment, at least some of this circuitry may be interconnected through a shared bus. For example, FIG. 3 illustrates an exemplary implementation of circuitry within digital processing circuit 120. In the example shown, an MCU 302 is coupled to slave devices 304-306 through an AHB (Advanced High Performance Bus) 310. One or more additional bus masters 312 may likewise be connected to AHB bus 310. Bus masters 312 are illustrative of any circuits capable of mastering (i.e., obtaining ownership of) AHB bus 310. For example, in one implementation as described below in conjunction with FIG. 5, one of bus masters 312 may be embodied by a DMA controller, while another bus master 312 may be embodied by a host interface. It is noted that in alternative embodiments, each of masters 312 may be embodied by other specific types of functional units, as desired.

Slaves 304-306 are likewise illustrative of a variety of specific resources accessible by bus masters. For example, in the embodiment described below in conjunction with FIG. 5, slaves 304-306 may be embodied by a memory controller, other slave memory devices (e.g., boot ROM), one or more bus bridges, and a host interface, for example. It is noted that in other embodiments slaves 304-306 may be embodied by other specific types of slave devices, including interface controllers, interrupt controllers, timers, clocks, etc.

FIG. 3 also illustrates an arbiter 315 that arbitrates between requests for ownership of AHB bus 310 from MCU 302 and other bus masters 312. In a single layer AHB bus implementation, arbiter 315 will only grant a single master ownership of the bus at a time. A master requests ownership of AHB bus 310 by asserting a request signal to arbiter 315. The arbiter 315 will grant a particular master ownership of AHB bus 310 based on a particular arbitration policy, such as round robin or any other arbitration scheme, as desired. Once granted, the master will perform its desired transaction. It is noted that AHB bus 310 may support both single transfers and burst transfers, including 4, 8, and 16 beat bursts as well as undefined length bursts.

As described above, TDI may result in a majority of the digital logic within digital processing circuit 120 to be gated during the shutdown mode while the radio is on. This may include MCU core 302. Prior to the transition to the shutdown mode of digital processing circuit 120, it may be important to perform certain "housekeeping" tasks to prepare the system for the shutdown mode. Such housekeeping tasks may include, for example, the filling or emptying of memory buffers (e.g., memory buffers that provide data to or receive data from RF front-end circuit 110), the completion of cycles to external memory, and other tasks to allow digital processing circuit 120 to be shutdown cleanly or in a known state.

The tasks required to prepare the system for the shutdown mode may need to be completed prior to the actual transition to the shutdown mode of digital processing circuit 120 (or before the radio goes active). Thus, in one embodiment, prior to the shutdown mode of operation, a high priority interrupt is provided to MCU core 302 that invokes an interrupt service routine. This service routine correspondingly performs the required tasks.

Figure 4A:
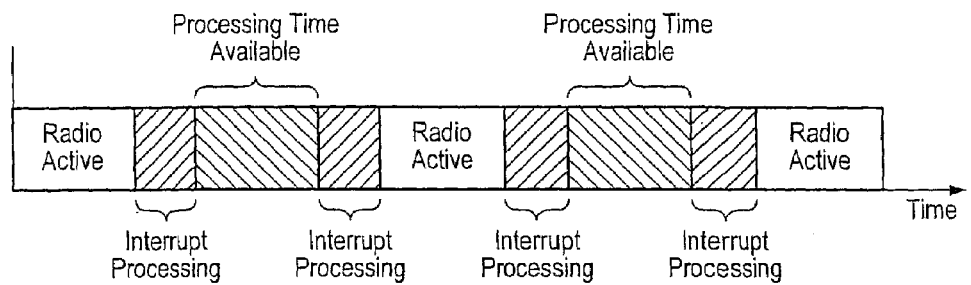
FIG. 4A illustrates interrupt processing activities.

Following radio activity, it may likewise be important to perform certain tasks immediately after the digital processing circuit 120 transitions back to a normal mode from the shutdown mode. Thus, in one embodiment, once the radio is turned off, a higher priority interrupt is provided to MCU 302 that invokes another service routine to perform the desired tasks. FIG. 4A illustrates these interrupt processing activities.

The tasks performed during interrupt processing are time critical, in that they may need to be completed prior to and/or immediately after radio activity to ensure proper or desired overall performance of the system. However, as is further illustrated in FIG. 4A, it may also be important to minimize the interrupt processing time to thereby maximize the window of processing time available for other processing activities within digital processing circuit 120.

To reduce the interrupt processing time, it may be beneficial to reduce the overall number of instructions comprising the interrupt service routines. For example, the interrupt service routines may be efficiently written in assembly code rather than using a compiler.

However, factors other than the instructions comprising the interrupt service routines may also contribute to the interrupt processing time periods. For example, MCU 302 and other masters 312 may contend for access to AHB bus 310. If other masters 312 are granted ownership of AHB bus 310, accesses by MCU 302 may be delayed, thus stalling execution. This problem may be of particular significance if another master 312 is performing a burst access and the MCU is required to wait for the entire burst to complete before re-arbitration will occur.

Figure 4B:
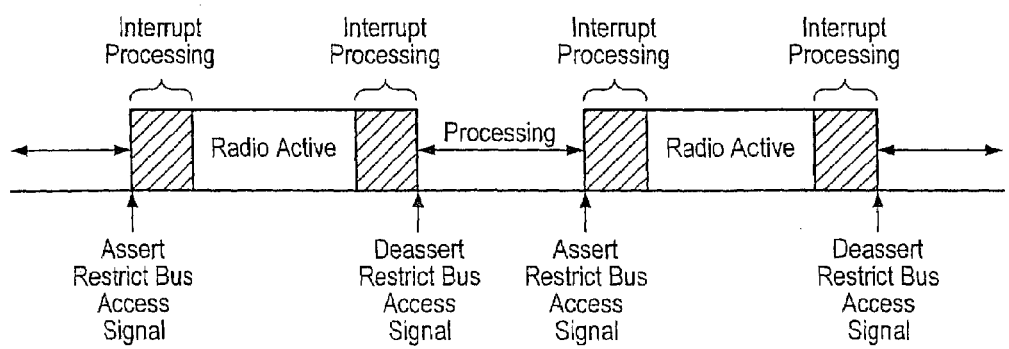
FIG. 4B illustrates assertions of a restrict bus access signal.

Thus, as illustrated in FIG. 4B, in one embodiment, to restrict access to AHB bus 310 by other masters 312, a restrict bus access signal is asserted a predetermined amount of time prior to a change to the radio active mode when (or shortly before) MCU 302 processes the interrupts. In response to assertion of the restrict bus access signal, arbiter 315 may cause any burst transfers being performed by other bus masters 312 to be terminated early. In addition, further requests to access AHB bus 312 by masters other than MCU 302 may not be granted by arbiter 315, thus leaving MCU 302 with exclusive access to AHB bus 310 and the associated slave resources while the restrict bus access signal is asserted.

The restrict bus access signal may be deasserted a predetermined time following completion of radio activity when (or shortly after) the interrupt processing completes. Upon deassertion of the restrict bus access signal, arbiter 315 may remove the access restriction and continue with its standard arbitration sequence. In this manner, other masters 312 may again be allowed access to the AHB bus 310. Further details regarding specific implementations of these operations are provided below.

Figure 5:
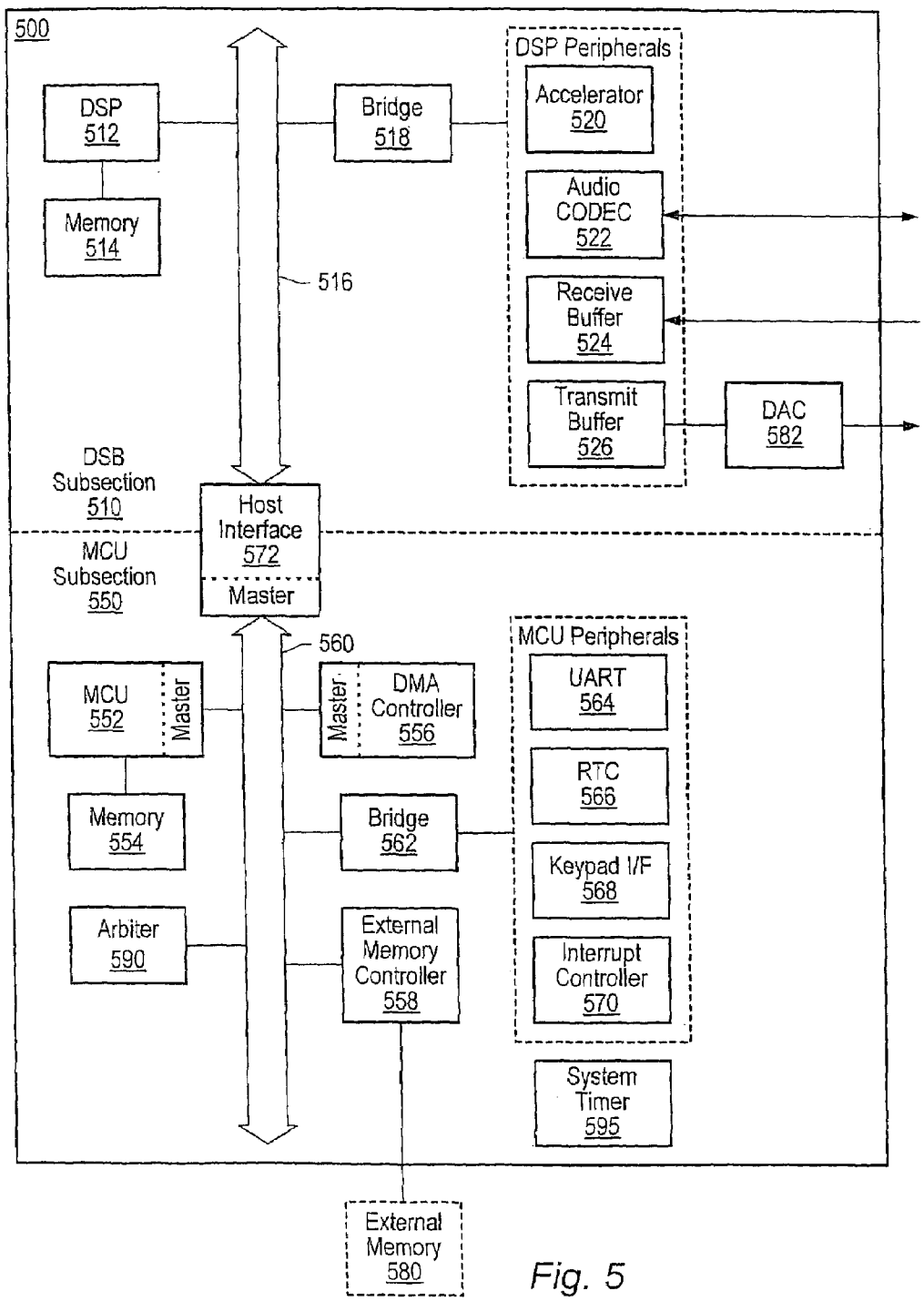
FIG. 5 illustrates a detailed block diagram of one embodiment of a digital processing circuit.

FIG. 5 illustrates a more detailed block diagram of one embodiment of digital processing circuit 500 that conforms generally to the digital processing circuit 120 of FIG. 1. The configuration of FIG. 5 may embody a baseband circuit of, for example, a mobile telephone and/or modem. In one embodiment, digital processing circuit 500 implements both the GSM communication standard as well as the GPRS standard.

Digital processing circuit 500 includes a DSP subsection 510 and an MCU subsection 550. As shown, DSP subsection 510 may include a DSP core 512 coupled to an associated memory 514. Various peripheral devices may be coupled to DSP core 512 through one or more buses 516 and bus bridges 518. In the illustrated embodiment, the peripherals include a hardware accelerator 520, an audio CODEC 522, a receive buffer 524, and a transmit buffer 526. It is noted that the specific number and types of peripheral devices provided within DSP subsection 510 may vary depending upon the application as well as the desired functionality and performance.

MCU subsection 550 includes an MCU core 552 coupled to an associated memory 554. Various peripherals including a DMA controller 556 and an external memory controller 558 are shown coupled to MOU 552 through AHB bus 560. Additional peripherals are further shown coupled to AHB bus 560 through a bridge 562. In the illustrated embodiment, these additional peripherals include a UART 564, a real time clock 566, a keypad I/F 568, and an interrupt controller 570. It is noted that various alternative peripherals may be provided, as desired, depending upon the desired functionality. It is also noted that a shared bus other than an AHB bus may be employed in other embodiments.

A host interface 572 is further shown for accommodating communications between DSP subsection 510 and MCU subsection 550. An external memory 580 is shown coupled to external memory controller 558. External memory 580 may comprise, for example, SRAM, flash, EEPROM, and/or other types of memory. It is noted that various additional external components (not shown in FIG. 5) may be coupled to digital processing circuit 500 including, for example, a keypad, a display, and interface cards such a SIM card, etc.

During operation, DSP subsection 510 may process data received from RF front-end 110 through receive buffer 524. DSP subsection 510 may likewise provide processed data to transmit buffer 526, which is then conveyed to RF front-end circuit 110 through a digital-to-analog converter. (DAC) 582. Audio CODEC 522 may receive an audio signal from an external microphone (not shown in FIG. 5) or provide an audio signal to a speaker (also not shown in FIG. 5). DSP 512, as well as hardware accelerator 520, if provided, may perform various low-level signal processing functions such as, for example, filtering, decimation, modulation, demodulation, coding, decoding, correlation and/or signal scaling, as desired.

In one embodiment, MCU subsection 550 is provided to perform higher-level processing functionality. For example, in one implementation, MCU subsection 550 may provide functionality to support the communication protocol stack and the housekeeping tasks as described previously. MCU subsection 550 may additionally implement interfaces such as an MMI (man-machine-interface) and may provide an execution environment for applications running in the system.

MCU subsection 550 is operable to implement the functionality described above in conjunction with FIGS. 3, 4A, and 4B. More particularly, in the illustrated embodiment, MCU core 552, DMA controller 556, and host interface 572 reside on AHB bus 560 as master devices. As such, any of these bus masters may initiate a request to gain ownership of AHB bus 560. The bus requests are provided to an arbiter 590 that controls the granting of ownership of AHB bus 560 in accordance with an arbitration scheme, such as round robin. It is noted that in one embodiment, MCU core 552 implements a processor core having a Harvard architecture. MCU core 552 may thus comprise separate bus request logic for code and data.

As illustrated in FIG. 5, digital processing circuit 500 may also include a system timer 595. In one embodiment, system timer 595 is provided to control overall system timing, including the timing of various system events associated with the time domain isolation functionality discussed above. Thus, system timer 595 may define the window of time during which the radio is active (and the times at which digital processing circuit 500 is placed in a shutdown mode). In one embodiment, system timer 595 generates additional timed events or signals that are indicative of and that are timed in relation to changes to and from the radio active windows (or timeslots).

More particularly, in one embodiment, a predetermined time prior to a change to an active radio mode, system timer 595 causes an assertion of the restrict bus access signal as discussed above that is provided to arbiter 590. System timer 595 may further cause assertion of a high priority interrupt that is provided to MCU core 552 (at the same time or shortly after assertion of the restrict bus access signal). In accordance with the foregoing description, MCU 552 responds to the interrupt by executing an interrupt service routine that performs housekeeping tasks to prepare for the shutdown mode of operation of digital processing circuit 500. These housekeeping tasks may include, for example, the filling of transmit buffer 526 with data, the emptying of data in receive buffer 524, the completion of cycles to external memory, and other tasks to allow the circuit to be shutdown cleanly or in a known state. In one implementation, the interrupt service routine concludes with execution of a Wait For Interrupt instruction. Shortly after, system timer 595 may generate a signal to cause digital processing circuit 500 to enter the shutdown mode of operation (e.g., by gating one or more clock signals). In addition, system timer 595 may cause initiation of radio activity (which may be commenced following a short settling time).

When radio activity completes (or a predetermined time thereafter), system timer 595 may generate a signal to discontinue the shutdown mode of operation of digital processing circuit 500 (e.g., by reenabling the clock or clock signals). System timer 595 may then cause assertion of a higher priority interrupt to MCU core 552. This higher priority interrupt may thus invoke a service routine to perform post-radio activity operations. System timer 595 may subsequently deassert the restrict bus access signal a predetermined amount of time later at approximately the same time when this interrupt service routine completes.

As described previously, assertion of the restrict bus access signal restricts accesses to AHB bus 560 by masters other than MCU core 552. For example, in one embodiment, in response to assertion of the restrict bus access signal, arbiter 590 may cause any burst cycles being performed by DMA controller 556 or host interface 572 to be terminated early. FIG. 6 is a timing diagram illustrating an exemplary early termination of a burst transaction initiated by DMA controller 556. As shown, when the restrict bus access signal is asserted, arbiter 590 deasserts the grant signal to DMA controller 556. It is noted that in the illustrated example, the fourth beat of the burst transfer does not complete. DMA controller 556 may complete this transfer at a later time when it re-acquires ownership of the bus after the restrict bus access signal is deasserted.

In one embodiment, arbiter 590 additionally restricts accesses to AHB bus 560 by granting ownership requests exclusively to MCU 552 during the time at which the restrict bus access signal is asserted. For example, as shown in FIG. 7, requests to AHB bus 560 by MCU 552 while the restrict bus access signal is asserted are repetitively granted, while a contending request by DMA controller 556 remains unsuccessful. Once the restrict bus access signal is deasserted, a request from DMA controller 556 or host interface 572 may be granted by arbiter 590, in accordance with its normal arbitration scheme. It is noted that when the restrict bus access signal is asserted, a normal one-cycle arbitration delay may be avoided in some implementations.

In accordance with the foregoing description, by restricting accesses to AHB bus 560, the time critical housekeeping tasks performed by the interrupt service routines may be initiated and completed deterministically within a relatively short period of time. In this manner, the window of processing time available for other tasks may be increased.

Numerous alternative embodiments are also possible. For example, various other techniques may be employed to restrict accesses by certain bus masters while the restrict bus access signal is asserted. For example, in one alternative embodiment, rather than controlling a bus arbiter to restrict the granting of ownership of a shared bus, certain bus masters may be configured such that they will not request ownership of the shared bus when the restrict bus access signal is asserted.

In another alternative embodiment, digital processing circuit 500 may include a programmable register that may be set in response to a signal generated under software control to cause bus accesses to be restricted, as discussed above. For example, the configuration register may be set to selectively restrict bus accesses in response to execution of a software instruction(s) in the interrupt service routine(s) described above. It is additionally noted that other devices may generate the restrict bus access signal, such as an interrupt controller or a general purpose timer.

In addition, while in the embodiments described above, a microcontroller unit implements the time critical functions for which exclusive bus access is provided (e.g., while the restrict bus access signal is asserted), other embodiments are possible in which alternative bus masters perform such time critical functionality (and for which exclusive access is provided). In addition, while in the embodiments described above the time critical tasks are performed through execution of interrupt service routines, other embodiments are also possible. For example, alternative embodiments are possible in which a set of time critical tasks are performed by non-interrupt driven software executing in a bus master or by hardware in a bus master. Such embodiments may restrict accesses to the shared bus by other bus masters in response to a signal indicating a change in a mode of operation in RF front-end circuit 110.

Still further, in some alternative embodiments, bus 310 (or bus 560) may be implemented as a multi-layer bus. A multi-layer bus allows multiple masters to access separate slaves simultaneously. For example, as illustrated in FIG. 3, a multi-layer AHB bus 310 implementation may allow MCU 302 to access slave 304 and a master 312 to access slave 305 or 306 at the same time. The number of layers dictate how many masters can perform transactions simultaneously.

In one embodiment employing a multi-layer AHB bus, accesses to the multi-layer bus may be restricted for masters other than MCU 302 (or MCU 552) when the restrict bus access signal is asserted. As such, bursts being performed by any non-MCU master may be terminated when the restrict bus access signal is asserted, and the granting of ownership of the multi-layer AHB bus may be exclusive to the MCU while the restrict bus access signal is asserted.

In an alternative embodiment employing a multi-layer bus, the arbiter may dedicate one layer to the MCU (or another master performing a time-critical function) and allow other masters to access other layers, even when the restrict bus access signal is asserted. The arbiter in such an embodiment may be configured to terminate bursts of masters performing transactions with slaves required by the MCU. In a further alternative embodiment employing a multi-layer bus, different high priority masters may be granted exclusive access, each to a respective layer. For example, in one such embodiment DMA controller 556 may be granted exclusive access to one layer of the bus (e.g., to load or unload data to or from a peripheral such as UART 564), while MCU 552 is granted exclusive access to another layer of the bus. In this manner, operations performed by both of the high-priority masters (e.g., MCU 552 and DMA controller 556) may be completed within a deterministic time.

It is finally noted that in various alternative embodiments, rather than providing exclusive access to a particular master (e.g., MCU 302 or MCU 552) in response to the restrict bus access signal, bus accesses may be restricted in other ways. For example, embodiments are possible which may continue to allow other masters to access the shared bus while the restrict bus access signal is asserted. In one such embodiment, the arbitration scheme may be altered when the restrict bus access signal is asserted such that a less favorable arbitration policy is provided to the other bus masters in comparison to the relative fairness provided by the normal arbitration policy. Likewise, the arbiter could be configured to allow other masters to access the bus while the restrict bus access signal is asserted, but break their bursts if the MCU requires access to the bus. In this manner, the MCU would still be given priority, but other masters would be allowed to gain resources if available without contention.

In addition, while the embodiment of FIG. 5 includes a DSP 512 and an MCU 552, embodiments are also possible that employ other digital processing circuits. For example, some embodiments may employ a DSP in the place of MCU 552. Likewise, embodiments are possible that employ a single MCU (or CPU), without a DSP. Still further embodiments may employ programmable logic devices (PLDs) or other hardware circuits in place of MCU 552.

Although the embodiments above have been described in considerable detail, numerous additional variations and modifications will become apparent to those skilled in the art once the above disclosure is fully appreciated. It is intended that the following claims be interpreted to embrace all such variations and modifications.

What is claimed is:

1. A communication apparatus comprising:
a radio frequency (RF) circuit for operating on a radio frequency signal, wherein the RF circuit includes an active mode of operation and an inactive mode of operation; and
a digital processing circuit coupled to the RF circuit, wherein the digital processing circuit includes:
a first bus master coupled to a bus;
one or more other bus masters coupled to the bus; and
an arbiter configured to arbitrate between requests to access the bus by the first bus master and the one or more other bus masters according to an arbitration policy during a first duration of the inactive mode of the RF circuit; and
wherein accesses by the one or more other bus masters to the bus are restricted during a second duration of the inactive mode of the RF circuit, thereby allowing unrestricted access to the bus by the first bus master.

2. The communication apparatus as recited in claim 1 wherein access by the one or more bus masters are restricted in response to a restrict bus access signal indicative of an impending change to the active mode of operation of the RF circuit.

3. The communication apparatus as recited in claim 2 wherein the restrict bus access signal indicates an impending change to a transmission mode of operation of the RF circuit.

4. The communication apparatus as recited in claim 2 wherein the restrict bus access signal indicates an impending change to a reception mode of operation of the RF circuit.

5. The communication apparatus as recited in claim 2 wherein the restrict bus access signal is asserted a predetermined amount of time prior to the change to the active mode of operation of the RF circuit.

6. The communication apparatus as recited in claim 2 wherein the restrict bus access signal is asserted a predetermined amount of time prior to a shutdown mode of operation of the digital processing circuit.

7. The communication apparatus as recited in claim 5 wherein the shutdown mode of operation includes disabling at least a portion of the digital processing circuit.

8. The communication apparatus as recited in claim 5 wherein the shutdown mode of operation includes disabling a clock that clocks at least a portion of the digital processing circuit.

9. The communication apparatus as recited in claim 2 wherein the restrict bus access signal indicative of a change of mode of operation of the RF circuit is generated by a timing circuit.

10. The communication apparatus as recited in claim 2 wherein the first bus master is provided, exclusive access to the bus in response to assertion of the restrict bus access signal.

11. The communication apparatus as recited in claim 2 wherein the bus is a multi-layer bus, wherein the first bus master is provided exclusive access to one layer of the bus in response to assertion of the restrict bus access signal while the one or more other bus masters are allowed access to another layer of the multi-layer bus.

12. The communication apparatus as recited in claim 2 wherein the bus arbiter is configured to restrict the granting of ownership of the bus to the one or more other bus masters in response to the restrict bus access signal.

13. The communication apparatus as recited in claim 2 wherein the one or more other bus masters are configured to inhibit requests to gain ownership of the bus in response to the restrict bus access signal.

14. The communication apparatus as recited in claim 2 wherein accesses by the one or more other bus masters are restricted by implementing a less favorable arbitration policy for the one or more other bus masters in response to the restrict bus access signal.

15. The communication apparatus as recited in claim 2 wherein accesses by the one or more other bus masters to the bus are restricted by terminating burst transfers early in response to the restrict bus access signal.

16. The communication apparatus as recited in claim 2 wherein the restrict bus access signal indicative of a change of mode of operation of the RF circuit is generated in response to execution of a software instruction.

17. The communication apparatus as recited in claim 1 wherein the first bus master is a microcontroller unit (MCU).

18. The communication apparatus as recited in claim 17 wherein an interrupt signal is provided to the MCU and wherein an interrupt service routine executed by the MCU in response to assertion of the interrupt signal is performed when accesses by masters other than the first bus master to the bus are restricted.

19. The communication apparatus as recited in claim 18 wherein the interrupt service routine performs functionality to prepare the digital processing circuit for a shutdown mode of the digital processing circuit.

20. The communication apparatus as recited in claim 1 wherein the first bus master is a digtal signal processor (DSP).

* * * * *

UNITED STATES PATENT AND TRADEMARK OFFICE
CERTIFICATE OF CORRECTION

PATENT NO. : 7,380,033 B2  
APPLICATION NO. : 11/479733  
DATED : May 27, 2008  
INVENTOR(S) : Matthews et al.

Page 1 of 1

It is certified that error appears in the above-identified patent and that said Letters Patent is hereby corrected as shown below:

In The Specification

In Column 7, Line 7, delete "bus 312" and insert -- bus 310 --, therefor.

In Column 7, Line 44, delete "MOU 552" and insert -- MCU 552 --, therefor.

In Column 7, Line 66, delete "converter." and insert -- converter --, therefor.

In The Claims

In Column 12, Line 6, in Claim 10, delete "provided," and insert -- provided --, therefor.

In Column 12, Line 51, in Claim 20, delete "digtal" and insert -- digital --, therefor.

Signed and Sealed this  
Third Day of May, 2016

Michelle K. Lee  
*Director of the United States Patent and Trademark Office*